United States Patent
Höppner (10) Patent No.: US 11,031,840 B2
(45) Date of Patent: Jun. 8, 2021

(54) DRIVE UNIT FOR AN ELECTRIC BICYCLE (71) Applicant: Werner Wirth GmbH, Hamburg (DE)

(72) Inventor: Sven Höppner, Hamburg (DE)

(73) Assignee: Werner Wirth GmbH, Hamburg (DE)

( * ) Notice: Subject to any disclaimer, the term of this patent is extended or adjusted under 35 U.S.C. 154(b) by 0 days.

(21) Appl. No.: 16/666,712

(22) Filed: Oct. 29, 2019

(65) Prior Publication Data

US 2020/0136462 A1    Apr. 30, 2020

(30) Foreign Application Priority Data

Oct. 29, 2018  (EP) .................................... 18203069

(51) Int. Cl.
| H02K 5/22 | (2006.01) |
| H02K 11/33 | (2016.01) |
| B62M 6/55 | (2010.01) |
| H01R 12/71 | (2011.01) |
| H01R 12/75 | (2011.01) |
| H01R 33/92 | (2006.01) |
| H01R 33/945 | (2006.01) |
| H02K 11/00 | (2016.01) |

(52) U.S. Cl.
CPC .............. *H02K 5/225* (2013.01); *B62M 6/55* (2013.01); *H01R 12/718* (2013.01); *H01R 12/75* (2013.01); *H01R 33/92* (2013.01); *H01R 33/945* (2013.01); *H02K 11/0094* (2013.01); *H02K 11/33* (2016.01); *H02K 2211/03* (2013.01)

(58) Field of Classification Search
CPC ........................................................ B62M 6/80
See application file for complete search history.

(56) References Cited

U.S. PATENT DOCUMENTS

| 10,069,226 B2 * | 9/2018 | Sauer ................... H01R 13/629 |
| 2004/0221181 A1 * | 11/2004 | Yu ........................... G06F 1/266 |
| | | 713/300 |
| 2013/0215582 A1 | 8/2013 | Dittrich et al. |
| 2017/0274963 A1 * | 9/2017 | Yamamoto ............. B62M 11/14 |

FOREIGN PATENT DOCUMENTS

| CN | 202042769 U | 11/2011 |
| DE | 102016219127 A1 | 4/2018 |
| EP | 2978077 A1 | 1/2016 |

OTHER PUBLICATIONS

EP Search Report for Application No. 18203069-2-1201; 7 pgs.

\* cited by examiner

*Primary Examiner* — Ross N Gushi
(74) *Attorney, Agent, or Firm* — Alix, Yale & Ristas, LLP (57) ABSTRACT

A drive unit for an electric bicycle with a drive housing and with a plug-in connector, wherein the plug-in connector is connected to the drive housing and wherein the plug-in connector includes a plurality of connector contacts and a plurality of plug contacts. The plug-in connector includes a circuit board. A distribution conductor track, which provides an electrical contact between a first number of connector contacts and a different second number of plug contacts, is formed on the circuit board.

19 Claims, 7 Drawing Sheets

DRIVE UNIT FOR AN ELECTRIC BICYCLE

BACKGROUND

The invention relates to a drive unit for an electric bicycle.

Bicycles may have a drive unit with a supporting electric motor to assist the cyclist, e.g. on inclines or during acceleration. The drive units of such electric bicycles may be located on the bottom bracket and may comprise sensors that detect the torque on the bottom bracket and the speed of the bicycle. A circuit on a circuit board determines from a comparison of the measurement data whether the motor has to accelerate the electric bicycle in order to relieve the load on the rider or to maintain a predetermined speed. During braking maneuvers, these motors can participate in recuperation as generators. The converted energy can be fed into external electrical storage and recalled at a later time. Furthermore, the drive units can serve as an energy source for peripheral devices such as lighting, a speed display, etc.

The drive unit requires electrical cables to the energy storage devices and peripheral devices (e.g. control elements, lighting, brakes, transmissions) to transmit energy or signals. Since the peripheral devices are usually not attached to the motor itself but to another location on the frame of the bicycle, cables are used to connect them that are connected to corresponding connections via electrical plug-in connectors.

Electrical connection solutions are known with which the cable is passed through the drive housing of the drive unit and with which there is no possibility directly on the drive housing for disconnecting the electrical connection. An electrical plug-in connection is only available at some distance from the drive housing. Often the electrical plug-in connection is arranged in the middle of a cable, i.e. being formed as a so-called flying plug-in connector.

Plug-in connectors are also known that are fixedly installed on the drive housing, EP 2 978 077 A1. Until now, it is common to connect each plug contact within the plug-in connector to a connection contact along a separate electrical path.

SUMMARY OF THE INVENTION

It is the object of the invention to introduce a drive unit in which the electrical connections are implemented in a space-saving form. Starting from the mentioned prior art, the object is achieved with the features of claim 1. Advantageous embodiments are specified in the subordinate claims.

The drive unit according to the invention includes a plug-in connector with a plurality of connector contacts and with a plurality of plug contacts. The plug-in connector includes a circuit board. A distribution conductor track is formed on the circuit board that provides an electrical contact between a first number of connector contacts and a second number of plug contacts, wherein the first number is different from the second number.

By encompassing within the plug-in connector a circuit board on which the electrical path between the connector contacts and the plug contacts is branched, a very space-saving possibility is presented for transmitting electrical signals within the plug-in connector. This opens up the possibility of making the drive housing of an electric bicycle more compact overall.

The drive housing can enclose an internal space of the drive unit. In the internal space of the drive unit, a motor, in particular an electric motor, may be arranged that is designed to support the pedaling force of a cyclist. The electric bicycle can include an energy source, for example in the form of an electric battery, by which the motor is supplied. The battery can be located outside the drive housing. Electrical cables making the connection between the power source and the motor may be passed through the housing wall and the drive housing.

In the interior of the drive housing, a control unit may be arranged that is designed to control the interaction between components in the interior of the drive housing and peripheral devices located outside the drive housing. In a simple case, the function of the control unit can be that a signal is routed from a peripheral device (e.g. a light switch) to another peripheral device (e.g. a lighting system). In other cases, the control unit determines output information (e.g. the power output of the motor) from a plurality of input information items (e.g. torque, speed, position of the gear switch). The motor of the drive unit can be controlled according to the output information of the control unit.

The plug-in connector of the drive unit according to the invention may be designed to establish a disconnectable electrical connection between components in the interior of the drive housing and peripheral devices outside the drive housing. The plug-in connector's connector contacts may be designed to be connected to the components in the interior of the drive housing. The electrical connection between the plug-in connector's connector contacts and the components in the interior of the drive housing may be set up in such a way that it cannot be disconnected when the drive unit is being used as intended. This does not rule out the possibility, for example, of disconnecting the electrical connection between the connector contacts and the components during maintenance work or after a partial dismantling of the drive unit.

In contrast, the plug contacts are preferably designed in such a way that they can be disconnected when the drive housing is being used as intended. For example, a user of the electric bicycle can unplug a connector from the plug-in connector's connector contacts to disconnect the battery from the drive unit.

The housing wall of the drive housing may be provided with an opening in which the plug-in connector is inserted. The plug-in connector may comprise a flange that rests on an adjacent surface of the drive housing. The flange may be a circumferential flange that extends over the entire circumference of the plug-in connector and/or the entire perimeter of the opening. The plug-in connector can close the opening tightly, especially in such a way that no water can penetrate. A seal may be arranged between the flange and the drive housing that preferably extends over the entire circumference of the plug-in connector.

With the plug-in connector, the number of connector contacts connected to the distribution conductor track may be fewer than the number of plug contacts connected to the distribution conductor track. In particular, the distribution conductor track can provide an electrical contact between a single connector contact and a plurality of plug contacts. The invention also includes the reverse design, in which the number of plug contacts connected to the connector contacts is greater than the number of plug contacts connected to the distribution conductor track, wherein in particular exactly one plug contact can be connected to the distribution conductor track.

The plug-in connector can be designed so that the number of connector contacts differs from the number of plug contacts. In particular, the number of connector contacts may be smaller than the number of plug contacts, wherein the reverse design is also possible.

The plug-in connector according to the invention may comprise a plurality of connector sockets that are designed to receive an electrical connector. For example, the plug-in connector may have at least two connector sockets, preferably at least four connector sockets, further preferably at least six connector sockets. In one embodiment, the plug-in connector comprises seven connector sockets.

The connector sockets may be round in cross-section or may have any other cross-sectional shape that does not in itself define a definite angular position for the connector. To avoid incorrect plug insertion, the connector sockets can be coded so that a connector can only be inserted into the connector socket at exactly one angle position.

The connector sockets may have pairs of different cross-section to prevent an incorrect connector from being plugged into a connector socket. If the plug-in connector contains a plurality of connector sockets with a non-definite cross-section, the connector sockets may be coded to prevent the insertion of an incorrect connector.

The connector sockets may be equipped with a locking mechanism into which an element of a connector can snap to prevent the connector from being released from the connection contact unintentionally.

Each of the connector sockets can include at least two plug contacts. The plug-in connector may comprise one or more connector sockets with at least three plug contacts, preferably with at least four plug contacts.

The plug-in connector may include a circuit board that has more than one distribution conductor track. All distribution conductor tracks can branch from the connector contacts towards the plug contacts, which means that the number of plug contacts connected to the distribution conductor track is greater than the number of connector contacts connected to the distribution conductor track. The invention also includes variants, with which some or all of the distribution conductor tracks branch off from the plug contacts towards the connector contacts. Also possible are distribution conductor tracks that connect a plurality of plug contacts together without being connected to a connector contact, wherein the plug contacts may relate to one connector socket or to a plurality of connector sockets. The plug-in connector may include a plurality of circuit boards, wherein each of the circuit boards may be equipped with one or more distribution conductor tracks.

The circuit board may have a distribution conductor track that connects a connector contact to plug contacts of more than one connector socket. In particular, a connector contact may be connected to plug contacts of at least three different connector sockets, further preferably of at least five different connector sockets. In one embodiment, the circuit board comprises a first conductor track and a second conductor track, each connecting a connector contact to plug contacts of such a number of connector sockets.

One or more individual conductor tracks can be formed on the circuit board, which connect exactly one connector contact to exactly one plug contact. The plug-in connector may include one or more connector sockets, wherein each connector socket comprises at least one plug contact that is connected to a connector contact via a single conductor track. In one embodiment, any electrical connection that exists within the connector between a plug contact and a connector contact is fed via a single conductor track or a distribution conductor track of the circuit board. The invention also includes plug-in connectors in which a connector contact is directly connected to a plug contact, i.e. by bypassing the circuit board.

The circuit board may be equipped with conductor tracks on its top and bottom that provide an electrical connection between one or more connector contacts and one or more plug contacts.

The connector contacts of the plug-in connector may be intended to be fixedly connected to a connection of the electric bicycle during normal operation of the electric bicycle. The connector contacts may be arranged in such a way that they are inaccessible without dismantling parts of the electric bicycle.

In contrast, the plug contacts may be accessible from the outside and may be intended to be connected and disconnected during normal operation of the electric bicycle. For example, the connection may be carried out in such a way that the user of the electric bicycle inserts a connector into a connector socket of the plug-in connector, so that one or more plug contacts of the connector socket are connected to corresponding electrical contacts of the connector. Conversely, the plug contacts can be disconnected by pulling a connector out of a connector socket.

The plug-in connector may include a plug-in connector housing that at least partially surrounds the circuit board, and the connector contacts extend to an exterior of said plug-in connector housing. The connector contacts can be led outwards from the plug-in connector housing so that the connector contacts can be connected to a connector of the electric bicycle. In one embodiment, the connector contacts are connected to the circuit board by cables. The circuit board can then be completely enclosed by the plug-in connector housing, so that only the cables are led outwards from the plug-in connector housing.

The connector contacts may be formed directly on the ends of the cables. The connector contacts may then be connected, for example, by soldering to corresponding connections of the electric bicycle. It is also possible to design the connector contacts as plug connectors. In this case, a plurality of or all connector contacts can be disposed within a common connector housing.

In an alternative embodiment, a portion of the circuit board protrudes outwards from the plug-in connector housing of the plug-in connector, wherein the connector contacts are arranged on the outward protruding portion of the circuit board. The connector contacts can be designed as contact pads on the circuit board section, so that a connector can enclose the connector contacts from above and below to make the electrical connection to the drive of the electric bicycle. It is also possible that the connector contacts are designed as a socket strip of the circuit board, onto which a plug coming from the drive of the electric bicycle can be plugged.

The plug contacts may be elements of the circuit board, for example, in that the plug contacts are soldered to the circuit board. The plug contacts may be designed as plug-in contacts (male contacts) or as receiving contacts (female contacts) or as a combination of the two.

The plug-in connector housing may include a plug-in connector housing front part on which the connector sockets are formed. The plug contacts can be passed through holes in the plug-in connector housing front part, so that the plug contacts protrude into the connector sockets. The circuit board can be arranged in an interior of the plug-in connector housing, wherein the interior is formed from the plug-in connector housing front part and a plug-in connector housing lid.

It is also possible to encapsulate a unit formed from the plug-in connector housing front and the circuit board with a casting compound to complete the plug-in connector housing. As a casting material, for example, a plastic or a casting resin can be considered, which are introduced into the plug-in connector housing in a liquid state and harden there. This allows the plug-in connector and especially the circuit board to be protected from damage caused by the ingress of moisture or mechanical loads.

In order to define the correct position of the circuit board relative to the connector housing body, the circuit board and/or the plug-in connector housing body can be provided with positioning elements that can only fit into each other if the circuit board is correctly positioned relative to the plug-in connector housing body. For example, the positioning elements may include a protrusion formed on one of the two parts that engages in a recess of the other part. In addition or alternatively, latching elements may be provided, with which the circuit board is fixed relative to the plug-in connector housing body. In one embodiment, the plug-in connector housing front part is provided with latching protrusions that encircle the circumference of the circuit board.

The circuit board may be equipped with further electrical or electronic components. For example, the circuit board may include a Bluetooth module. The plug-in connector housing of the plug-in connector may include a housing projection that is designed to accommodate the Bluetooth module. The housing projection may protrude in the same direction as the connector sockets. The circuit board may be equipped with other components such as LEDs, coils, resistors and the like.

The plug-in connector forms an interface to the drive unit of an electric bicycle. For this purpose, the plug-in connector is connected to a drive housing of the electric bicycle. The plug-in connector may include a flange by which a housing body of the plug-in connector that is arranged in the drive housing is separated from the outside of the plug-in connector. The outside of the plug-in connector may be accessible to the user while the plug-in connector housing body is within the drive housing.

The flange of the plug-in connector may form a circumferential sealing surface that is designed to seal with the drive housing of the electric bicycle. In the flange, bores can be formed through which the plug-in connector is connected to the drive housing. The circumferential sealing surface may form an uninterrupted sealing path that extends over the circumference of the connector and that may be arranged peripherally to the bores. The plug-in connector may include a seal that extends along the sealing surface and that preferably also encircles the bores.

The plug-in connector's plug contacts may be designed to supply the drive of the electric bicycle with electrical energy, to supply peripheral devices and/or to exchange signals with peripheral devices. The peripheral devices may relate to the sensor arrangement and/or parts of the HMI (Human Machine Interface). The peripheral devices may include, for example, an energy storage system of the drive, lighting of the electric bicycle, a display, a gear switch, a speed sensor and/or a display for the state of charge of the energy storage system. The plug-in connector's plug contacts can, for example, carry out the function of a power supply, a ground connection and/or a data bus.

The invention also relates to an electric bicycle equipped with such a drive unit. The plug-in connector's connector contacts can be connected to connectors of the drive of the electric bicycle. The connection can be designed in such a way that it is not disconnected by the user during normal operation. The plug contacts of the plug-in connector may be accessible to the user, so that connectors can be plugged in or disconnected during normal operation.

BRIEF DESCRIPTION OF THE DRAWINGS

The invention is described below with reference to the attached drawings on the basis of advantageous embodiments by way of example. In the figures.

DETAILED DESCRIPTION

Figure 1:
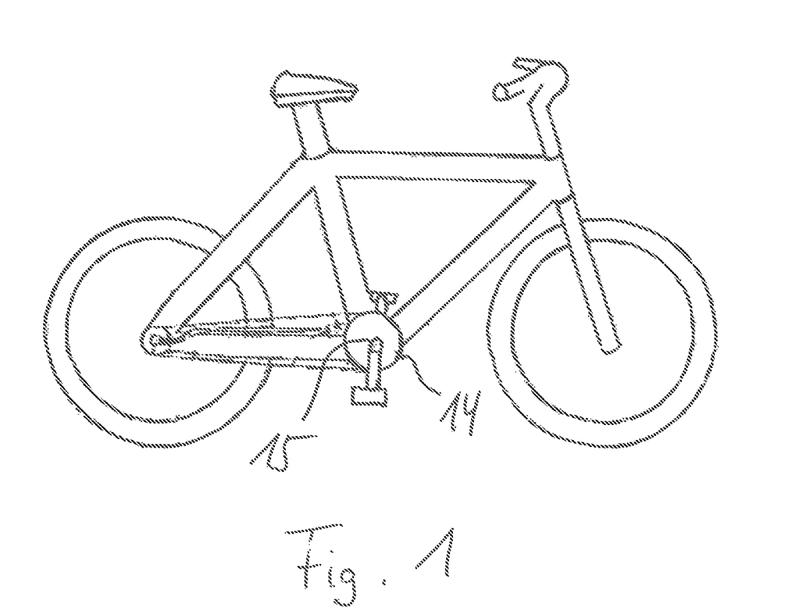
FIG. 1 shows an electric bicycle according to the invention.

An electric bicycle shown in FIG. 1 comprises a drive unit 45 that is located near the bottom bracket 14 of the electric bicycle. The drive unit 45 supports the crank shaft 15 during travel when additional energy is needed for acceleration or on inclines. If no energy is needed, it absorbs additional energy that can be released by braking maneuvers, for example.

Figure 12:
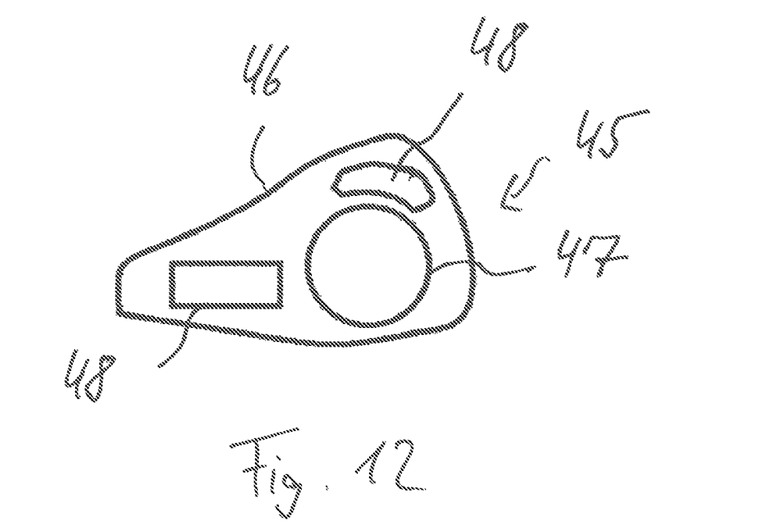
FIG. 12 shows a drive unit according to the invention.
Figure 13:
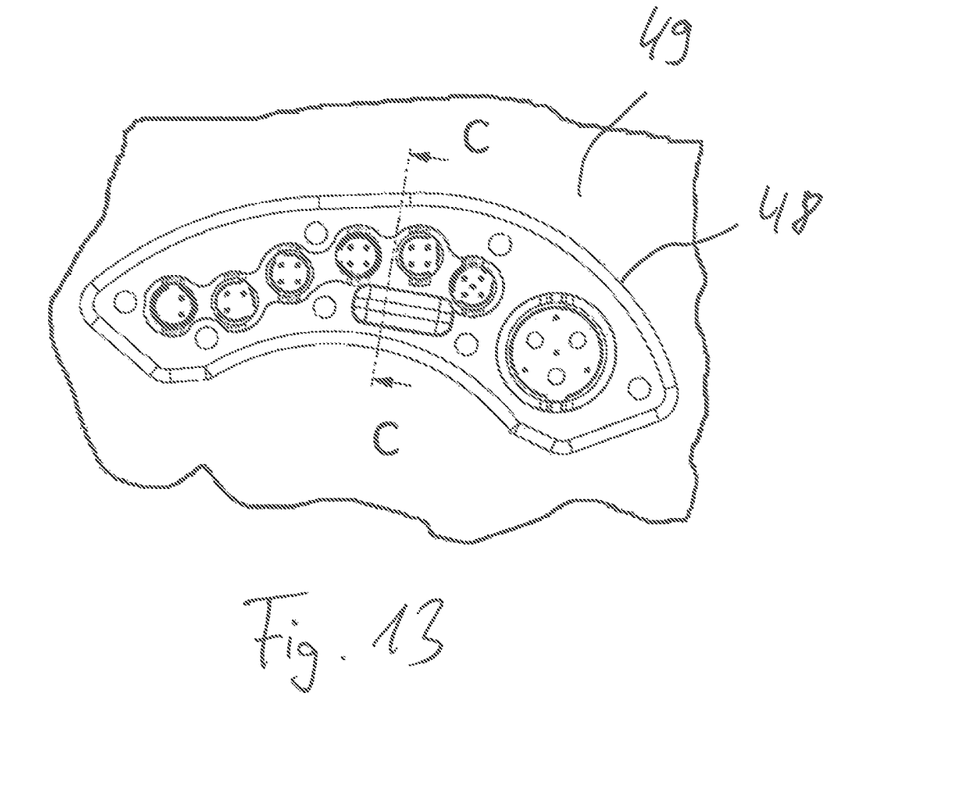
FIG. 13 shows a detail from FIG. 12 in an enlarged representation.

According to FIG. 12 the drive unit 45 comprises a drive housing 46 in which an electric motor 47 and a control unit 48 are accommodated. The electric motor 47 is coupled to the pedal crank shaft 15. The control unit 48 controls the interaction of components within the drive unit 45 as well as the interaction with peripheral devices outside the drive unit 45. A plug-in connector 48 is arranged in a housing wall 49 of the drive housing 46. The plug-in connector 48 includes plug contacts 22 that are externally accessible and connector contacts 35 to which the control unit 48 and the electric motor 47 are connected.

Figure 14:
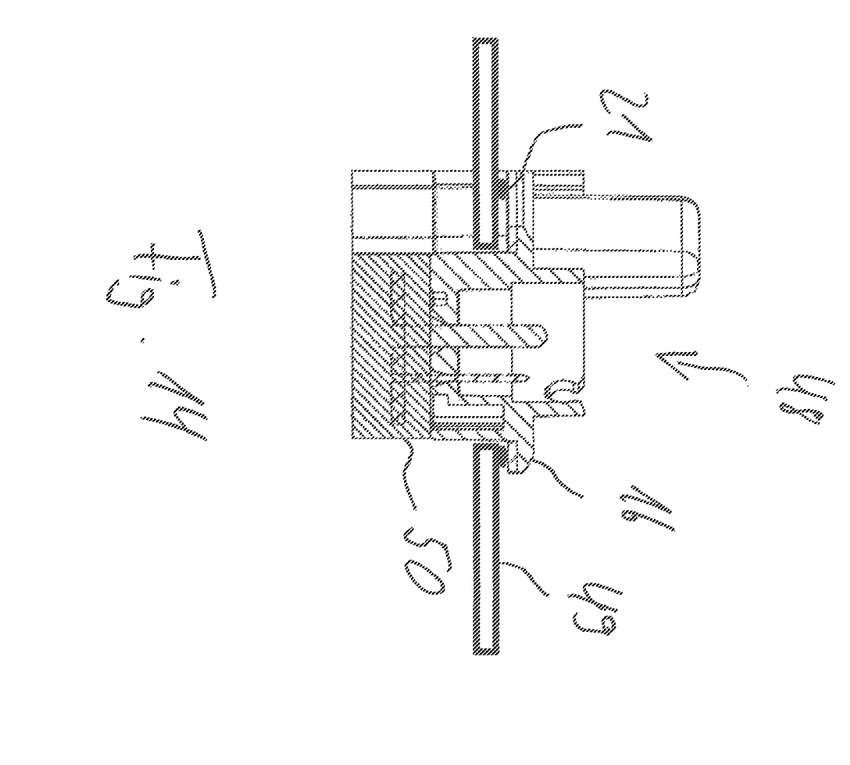
FIG. 14 shows a section along line C-C in FIG. 13.

According to FIG. 14 the plug-in connector 48 comprises a peripheral flange 16 that rests on the housing wall 49. A seal 21 is arranged between the flange 16 and the housing wall 49.

The plug-in connector 48 forms an interface between the drive unit and peripheral devices connected to the drive unit. The peripheral devices include a battery that supplies the drive unit 45 with energy, for example. Furthermore, the peripheral devices include sensor elements as well as elements of the HMI (Human Machine Interface). Such peripheral devices are, for example, the lighting, a speed sensor, a display or a gear switch. The user can plug a plug connector into the plug-in connector 48 to connect the peripheral device or can pull the plug connector out of the plug-in connector 48 to disconnect the peripheral device. A power supply, a ground connection and/or one or more data bus lines are typically required to supply the peripheral devices and to communicate with the peripheral devices. The plug-in connector is equipped with a plug contact 22 for each of the electrical paths.

Figure 2:
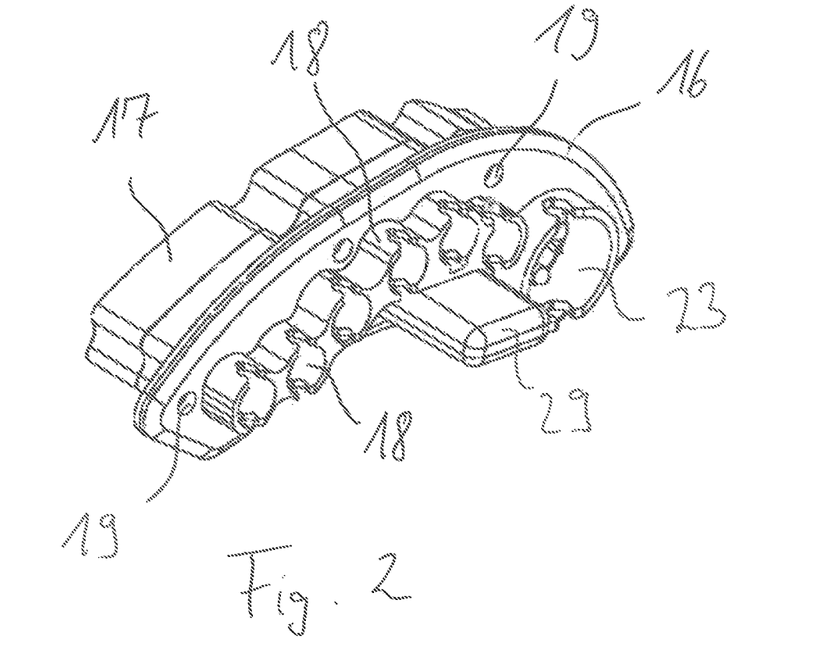
FIG. 2 shows a perspective view of a plug-in connector of a drive unit according to the invention.
Figure 3:
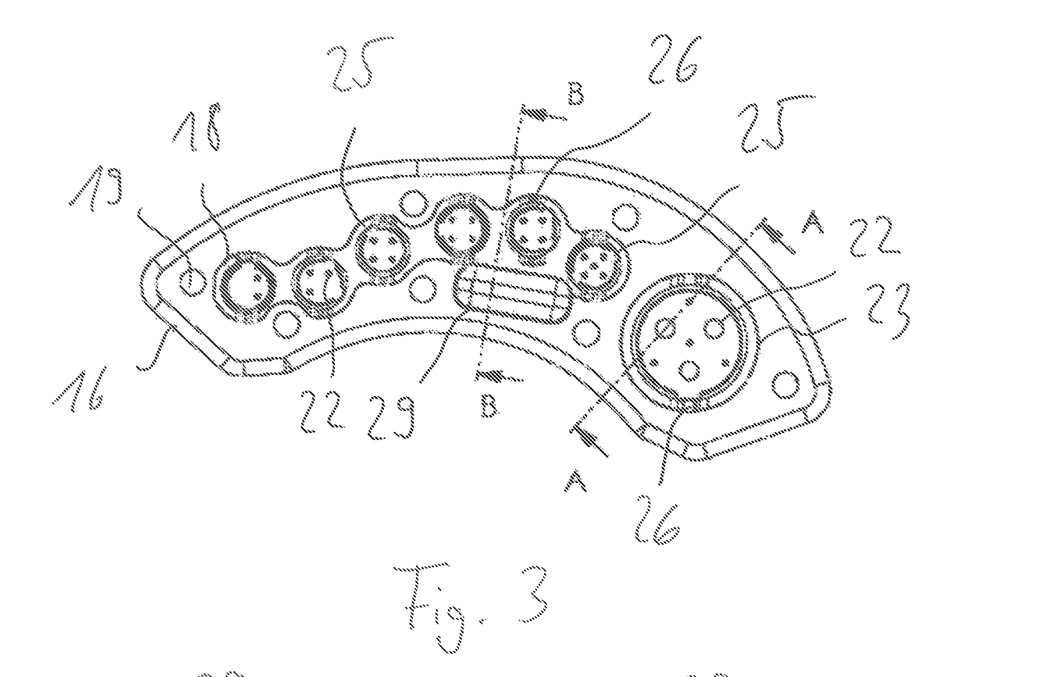
FIG. 3 shows a view from above of the connector from FIG. 2.

According to FIG. 2 the plug-in connector 48 has a shape that is matched to the rounded contour of the electric motor 47. The flange 16 of the plug-in connector 48 is located on the drive housing 46 and a body 17 of the plug-in connector 48 protrudes into the interior of the drive unit 45. The outside, which is equipped with a plurality of connector sockets 18, 23, points outwards and is accessible to the user. The flange 16 is provided with a plurality of bores 19, via which the plug-in connector is firmly screwed to the drive housing. The bores 19 are arranged in a sealing surface 20 of the flange 16. A seal 21 rests on the sealing surface 20 and forms an uninterrupted sealing section arranged outside the bores 19 that extends over the entire circumference of the plug-in connector. The bores 19 are covered by the seal 21, so that the fastening screws with which the plug-in connector is attached to the drive housing extend through the seal 21, see FIG. 11.

Figure 6:
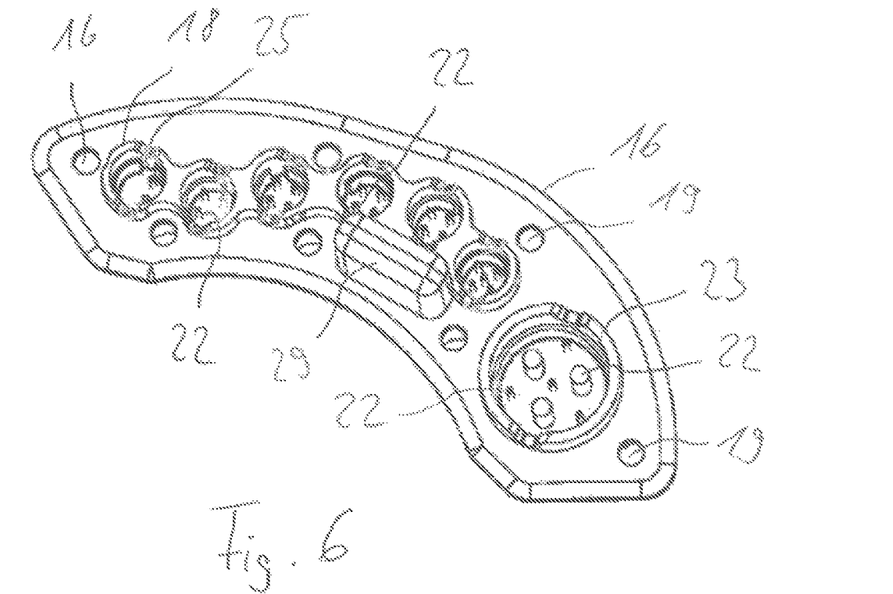
FIG. 6 shows another perspective view of the plug-in connector from FIG. 2.

According to FIG. 6, the plug-in connector comprises six connector sockets 18 with the same diameter and one connector socket 23 with a larger diameter. The connector socket 23 is used for supplying power and is connected to the battery. It has a total of seven plug contacts 22, with the three thicker ones for supplying power and the four thinner ones for carrying information about the state of charge of the battery. The connector sockets 18 are used to connect the various peripheral devices. The connector sockets 18 comprise between two and five plug contacts 22. The connector sockets 18 are coded by structures 25 arranged peripherally to the plug contacts 22, so that each plug contact fits in a certain connector socket 18 exactly in a single angular position. In each case a snap-in structure 26 is formed at the circumference of the connector sockets 18, 23, into which a protrusion of the connector can snap to prevent unintentional loosening of the connector.

Figure 11:
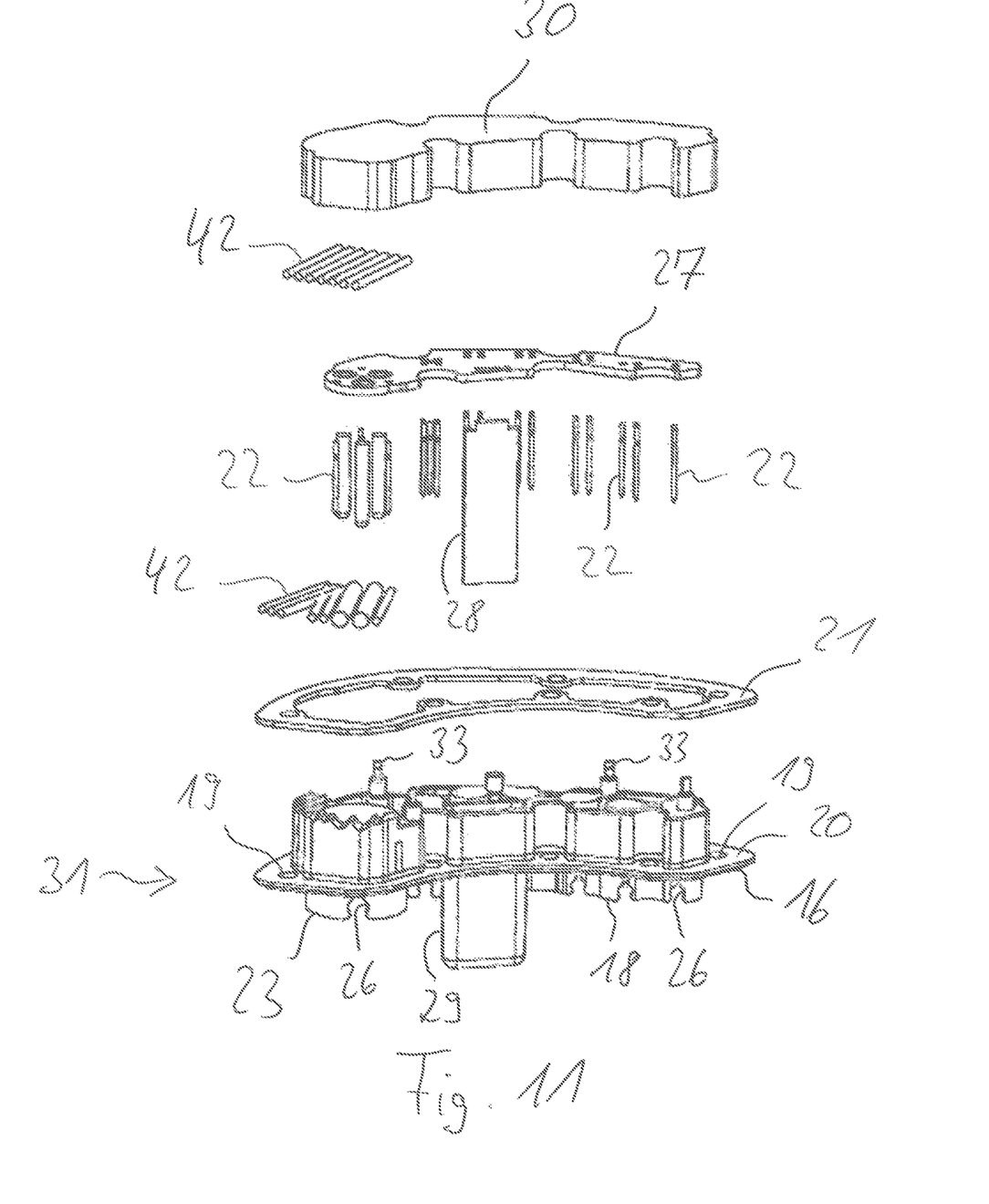
FIG. 11 shows an exploded view of a plug-in connector according to the invention.

According to FIG. 11 a circuit board 27 to which the plug contacts 22 are soldered in suitable positions is arranged inside the plug-in connector 48. The plug contacts 22 are passed through bores in a plug-in connector housing front part 31 of the plug-in connector with the plug-in connector in the assembled state, so that the plug contacts 22 protrude into the connector sockets 18, 23 as shown in FIG. 6. In addition, a Bluetooth module, which is housed in a housing projection 29 in the assembled state of the plug-in connector 28, is connected to the circuit board 27. In addition, the circuit board 27 can be fitted with other electrical or electronic components, such as LEDs, coils and the like.

Figure 4:
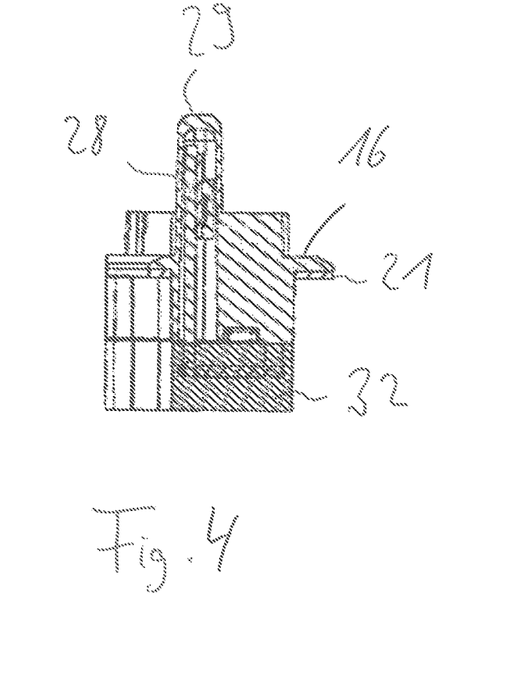
FIG. 4 shows a section along line B-B in FIG. 3.
Figure 5:
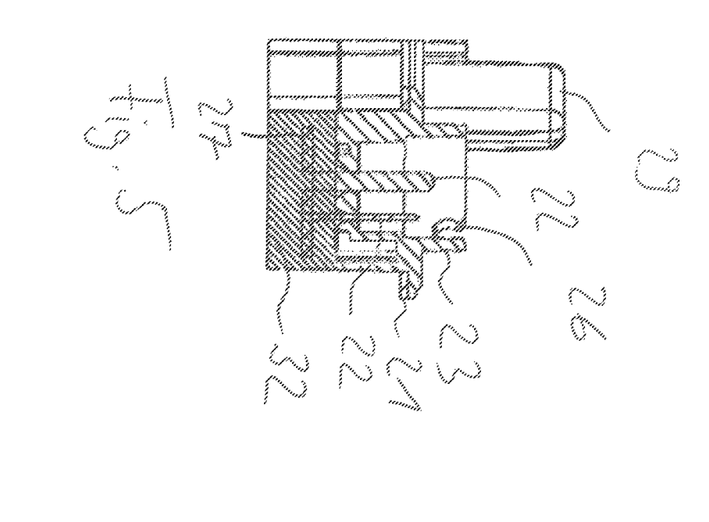
FIG. 5 shows a section along line A-A in FIG. 3.

According to FIG. 11, the front part 31 of the plug-in connector housing is provided with latching protrusions 33 that encircle the circumference of the circuit board 27 and thus hold the circuit board 27 in the appropriate position relative to the front part 31 of the plug-in connector housing. In the embodiment according to FIG. 11, the plug-in connector housing is closed at the back by a housing cover 30. In alternative embodiments, the front part 31 of the plug-in connector housing is first fitted with the circuit board 27 and then encapsulated from the rear with a liquid plastic material 32, see FIGS. 4 and 5.

Figure 7:
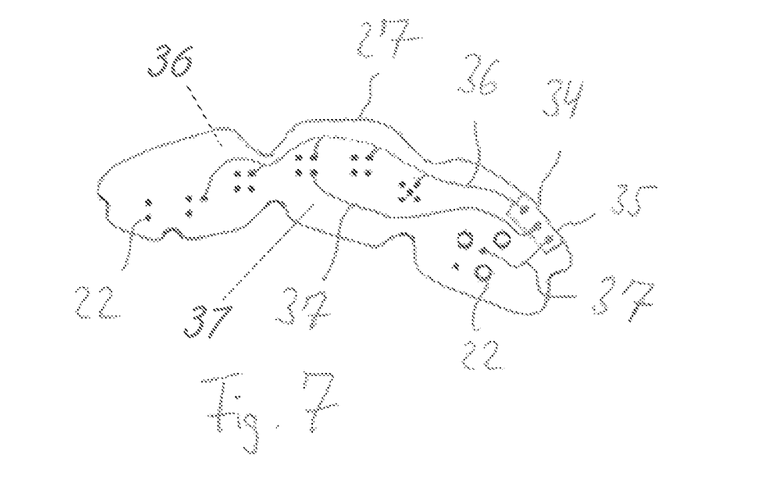
FIG. 7 shows a circuit board of a plug-in connector according to the invention.

In FIG. 7 a circuit board 27 is shown, in which the positions of the plug contacts 22 are indicated by dots. The circuit board 27 is provided with a connection zone 34, through which the electrical path from the plug contacts 22 to the connector contacts 35 is guided. The connector contacts 35 of the plug-in connector 48 are connected to components in the interior of the drive unit 45.

In the case of the circuit board 27 in FIG. 7, three connector contacts 35 are shown schematically. The circuit board 27 comprises a conductor track 36 that extends from the left connector contacts 35 to a plurality of plug contacts 22. Such a conductor track is a distribution conductor track 36 in the sense of the invention. The other two connector contacts 35 of the connection zone 34 are each connected via single conductor tracks 37 to a single plug contact 22. To make good use of the available space, the circuit board 27 can be fitted with conductor tracks 36, 37 on its front and on its back. The conductor tracks 36, 37 are designed in such a way that there is an electrical path from each plug contact 22 to exactly one connector contact 35. Conversely, there can be an electrical path from a connector contact 35 either to exactly one plug contact 22 (single conductor track 37) or to a plurality of plug contacts 22 (distribution conductor track 36). The plug-in connector according to the invention therefore comprises a smaller number of connector contacts 35 than of plug contacts 22.

Figure 8:
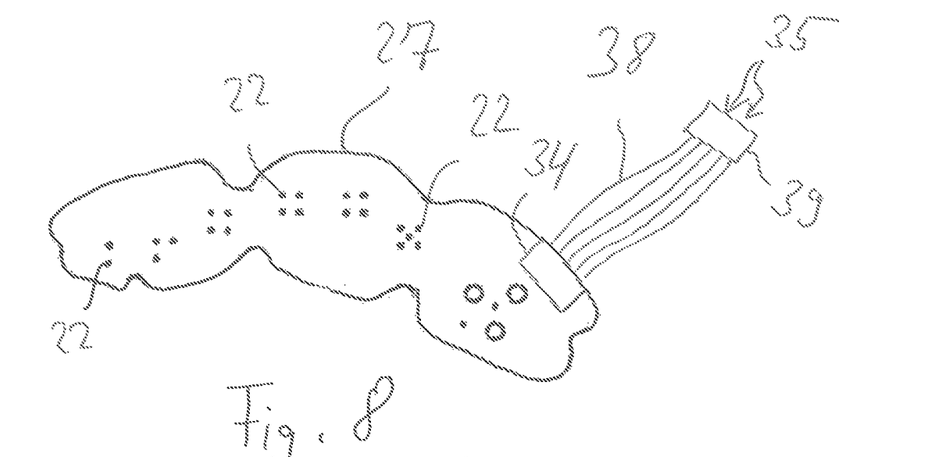
FIGS. 8 to 10 show different variants of connector contacts of the circuit board.

There are various variants for the design of the connector contacts. In FIG. 8 a cable 38 is soldered in the connection zone 34 of the circuit board 27 for each connector contact 35. The cables 38 are commonly guided in a connector housing 39, so that the connector contacts 35 are arranged within the connector housing 39. Cable sleeves 42 with which the cables 38 are led out of the plug-in connector housing of the plug-in connector are shown in FIG. 11.

Figure 9:
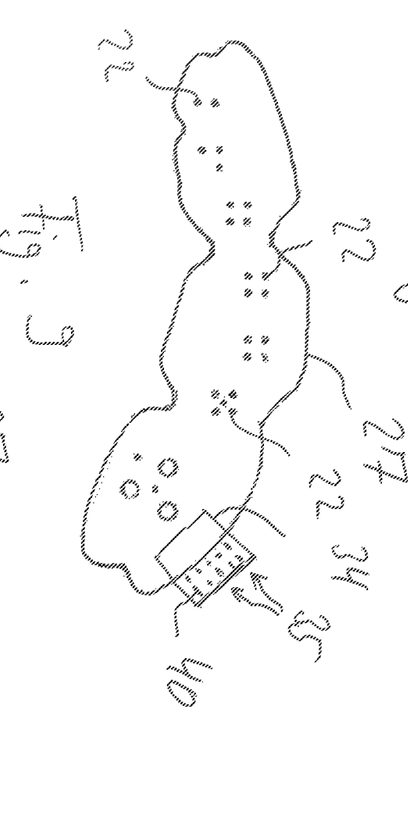

In the embodiment according to FIG. 9 the connection zone 34 is enlarged and has a contact pin 40 for each connector contact 35. A combination plug of the drive unit 45 of the electric bicycle can be plugged onto the contact pins 40, so that all connector contacts 35 simultaneously receive an electric connection to the drive unit.

Figure 10:
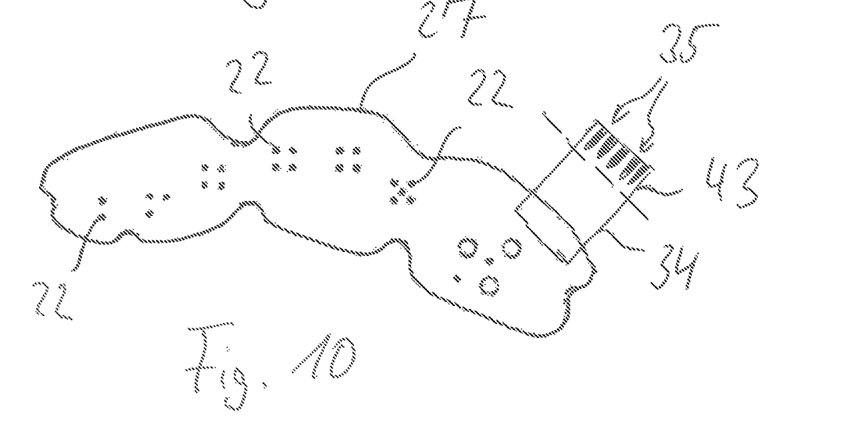

FIG. 10 shows an embodiment in which the circuit board 27 has a protruding section that protrudes beyond the contour of the plug-in connector housing (indicated by the dashed line). In the externally accessible circuit board section 43, a contact pad 41 is formed for each connector contact 35, wherein the contact pads 41 can be arranged on both the top and the bottom of the circuit board 27. The electrical connection to the drive of the electric bicycle can be made via a connector that clamps the contact pads 41 from above and below.

The invention claimed is:

1. A drive unit for an electric bicycle, the drive unit comprising:
    a drive housing (46); and
    a plug-in connector (48), wherein the plug-in connector (48) is connected to the drive housing (46), wherein the plug-in connector (48) includes a plurality of connector contacts (35) and a plurality of plug contacts (22), wherein the plug-in connector comprises a circuit board (27), wherein the plug-in connector (48) comprises a flange (16) by which a housing body (50) of the plug-in connector (48) is mounted inside the drive housing (46), and wherein a distribution conductor track (36) is formed on the circuit board that provides an electrical contact between a first number of connector contacts (35) and a second number of plug contacts (22), wherein the first number is different from the second number.

2. The drive unit of claim 1, wherein the connector contacts (35) are connected to components (47, 48) in an interior of the drive housing (46) and that the plug contacts (22) are accessible from an exterior of the drive housing (46).

3. The drive unit of claim 1, wherein the plug-in connector comprises a plurality of connector sockets (18, 23), wherein each connector socket (18, 23) is designed to receive an electrical connector.

4. The drive unit of claim 3, wherein each connector socket (18, 23) includes a plurality of plug contacts (22).

5. The drive unit of claim 3, wherein a connector contact (35) is electrically connected to plug contacts (22) of more than one connector socket (18, 23).

6. The drive unit of claim 1, wherein the circuit board (27) includes one or more single conducting tracks (36) that connect exactly one connector contact (35) to exactly one plug contact (22).

7. The drive unit of claim 1, wherein the circuit board (27) has a top and an underside and is equipped with conductor tracks (36, 37) on the top and the underside that provide an electrical connection between one or more connector contacts (35) and one or more plug contacts (22).

8. The drive unit of claim 1, wherein the plug-in connector (48) includes a housing (30, 31) at least partially surrounding the circuit board (27), and the connector contacts (35) extend to an exterior of said housing (30, 31.

9. The drive unit of claim 8, wherein each of the connector contacts (35) are connected by cables (38) to the circuit board (27), and the cables (38) extend from an interior of the housing (30, 31) to the exterior of said housing (30, 31).

10. The drive unit of claim 8, wherein a section (43) of the circuit board (27) protrudes from the housing (30, 31, 32) and the connector contacts (35) are arranged on the outwardly protruding section (43) of the circuit board (27).

11. The drive unit of claim 10, wherein the connector contacts (35) are designed as a socket strip (40) on the circuit board (27).

12. The drive unit of claim 1, wherein the plug contacts (22) are elements of the circuit board (27).

13. The drive unit of claim 1, wherein a housing of the plug-in connector (48) is formed by encapsulating a unit formed from a housing front part (31) and the circuit board (27).

14. The drive unit of claim 1, wherein the circuit board (27) is provided with a Bluetooth module (28) or an LED.

15. The drive unit of claim 1, wherein the drive unit is configured to support a crank shaft of the electronic bicycle.

16. A drive unit for an electric bicycle, the drive unit comprising:
   a drive housing (46); and
   a plug-in connector (48) connected to the drive housing (46), wherein the plug-in connector comprises a circuit board (27), wherein a distribution conductor track (36) of the circuit board is connected between a connector contact (35) of the plug-in connector (48) and a plug contact (22) of the plug-in connector (48), and wherein the plug-in connector (48) comprises a flange (16) by which a housing of the plug-in connector (48) is mounted inside the drive housing (46).

17. The drive unit of claim 16, and wherein the plug-in connector (48) includes a plurality of connector contacts (35) and a plurality of plug contacts (22), and wherein the distribution conductor track (36) is between a first number of the plurality of connector contacts (35) and a second number of the plurality of plug contacts (22), wherein the first number is different from the second number.

18. The drive unit of claim 16, wherein the circuit board (27) is provided with a Bluetooth module (28) or an LED.

19. The drive unit of claim 16, wherein the drive unit is configured to support a crank shaft of the electronic bicycle.

* * * * *